United States Patent [19]

Solomon et al.

[11] Patent Number: 4,847,890
[45] Date of Patent: Jul. 11, 1989

[54] ANONYMOUS INTERACTIVE TELEPHONE SYSTEM

[75] Inventors: Merrill Solomon, Washington, D.C.; John Kimball, Germantown, Md.

[73] Assignee: The Telephone Connection, Washington, D.C.

[21] Appl. No.: 83,645

[22] Filed: Aug. 10, 1987

[51] Int. Cl.⁴ .......................... H04M 1/64; H04M 1/66
[52] U.S. Cl. .................................... 379/6.7; 379/196; 379/211; 379/212
[58] Field of Search .................. 379/67, 84, 82, 79, 379/188, 196, 197, 211, 212, 199

[56] References Cited

U.S. PATENT DOCUMENTS

| | | | |
|---|---|---|---|
| 3,614,328 | 10/1971 | McNaughton et al. | 379/211 X |
| 3,626,109 | 12/1971 | Bartlett et al. | 379/197 |
| 3,959,600 | 5/1976 | Sousa | 379/157 |
| 4,313,035 | 1/1980 | Jordan et al. | 379/207 |
| 4,577,062 | 3/1986 | Hillary et al. | 379/88 |
| 4,611,094 | 9/1986 | Asmuth et al. | 379/89 |

FOREIGN PATENT DOCUMENTS

| | | | |
|---|---|---|---|
| 0156058 | 12/1981 | Japan | 379/79 |
| 0096447 | 6/1983 | Japan | 379/211 |
| 0052954 | 3/1984 | Japan | 379/211 |
| 0142848 | 6/1986 | Japan | 379/211 |

Primary Examiner—Thomas W. Brown
Attorney, Agent, or Firm—Fleit, Jacobson, Cohn, Price, Holman & Stern

[57] ABSTRACT

A method and apparatus for establishing telephone communications between service subscribers and responding callers through a central system while preserving confidentiality and mutual anonymity of the subscribers and callers. Incoming calls from callers intended for subscribers identified by coded entries, are transferred by the system controller and a digital switch either to a message recording facility or directly to the subscriber. If the subscriber is unavailable, a message can be left by the caller, but does not need to include the telephone number of the caller. The subscriber then is able to call the caller, through the central system controller, without breaching anonymity of either the caller or the subscriber.

35 Claims, 10 Drawing Sheets

ANONYMOUS INTERACTIVE TELEPHONE SYSTEM

BACKGROUND OF THE INVENTION

The present invention relates to a method and a system for placing and responding to published advertisements.

Many magazines and newspapers regularly publish special classified sections commonly referred to as "personals" in which parties wishing to form relationships with other parties may place ads. The typical ad describes the person placing the ad, the type of relationship desired, and the type of person he or she would like to meet. Other persons reading such ads and also wishing to form personal relationships, will contact the person who placed the ad if their interest appear to coincide. Contact is established between such persons by mail, generally sent to a blind post office box keyed to a code appearing in the ad. The post office box is usually managed by the magazine or newspaper.

Some people hesitate to use the "personals", even though they are interested in establishing relations, because of a perceived indignity in the process. Others feel uncomfortable about revealing personal information to a stranger. And there are some who will not respond to a "personals" ad because they feel that they are unable to communicate effectively in writing. Finally, for all those who use the "personals", there is no way of eliminating a delay of a few days or more between the appearance of an ad and the contact between two interested parties.

There is therefore a need to favorably alter the perception about individuals who use "personals" and thereby increase the number of people placing and responding to such ads.

There also is a need to provide a "personals" service in which confidentiality and anonymity of all parties can be preserved.

Further, there is a need for a "personals" service in which responding to an ad can be accomplished without using the mailed letter format.

Additionally, there is a need for a "personals" service which enables an immediate and direct contact between a person answering an ad and the person who placed the ad.

There is also a need for an advertising system that can be easily modified in its format, and done so by the subscriber to the system.

Finally, there is a need to expand certain of these concepts to standard classified advertisement systems.

Objects of the present invention are to satisfy each of these needs.

SUMMARY OF THE INVENTION

This invention relates to a telephone system through which mutually anonymous parties may conduct telephone communication with each other, without delay, and maintain such communication anonymous for as long as they desire.

In accordance with the present invention, "personals" ads are placed and published as previously known. A person reading an ad (hereinafter referred to as the caller), and interested in establishing a personal relationship with the person who placed the ad (herein referred to as the subscriber), uses his or her telephone and calls a telephone number published in the "personals" column. The number called connects the caller to a central computer-based system, and the caller is prompted (by speech synthesis, recorded message, or the like) to enter the subscriber's reference number (SRN) furnished in the ad and unique to the subscriber. The computer then uses the subscriber reference number as an index to locate the subscriber's telephone number, and after verifying certain conditions to be explained below, automatically connects the caller to the subscriber. Only the computer is aware of the identity of the subscriber and the subscriber's telephone number (and the caller as well), and hence the parties can communicate with one another while being mutually anonymous for as long as they desire.

If the subscriber to whom a call is placed is not available or does not wish to answer the telephone, or if the subscriber's line is busy, the system offers the caller the ability to record a personal voice message for the subscriber. The caller is not, however, required to reveal his or her identity or telephone number to the subscriber in order to enable the subscriber to call back. Such feature of the system is achieved by the computer assigning to the caller a unique callback reference number (CBRN) that is indexed by the computer to the caller's phone number. The callback reference number is automatically included with any voice message that was left by the caller. The subscriber then may return the call from the caller by using the caller's callback reference number, and speak with the caller while maintaining complete privacy for both parties.

The preservation of such mutual anonymity, and the capability of rapidly exchanging personal thoughts and feelings over the telephone, involves a completely new concept for establishing relations between individuals through the "personals".

The specifics of the present invention which make possible such new concept, together with the objects and advantages noted above, will become apparent when reference is made to the accompanying drawings and the following description.

DETAILED DESCRIPTION OF PREFERRED EMBODIMENT

Figure 1:
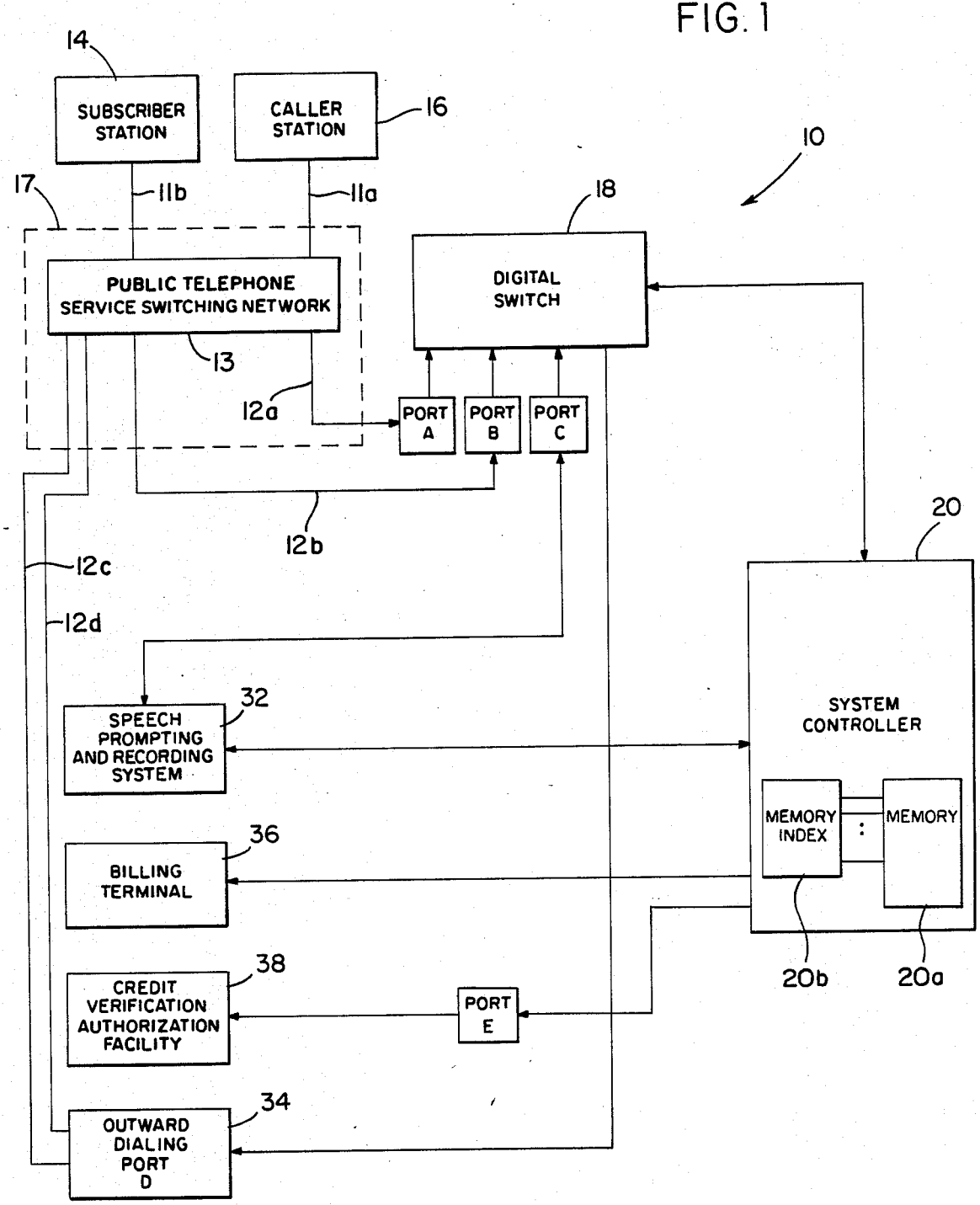
FIG. 1 is a block diagram illustrating the anonymous interactive telephone system of the present invention.

Referring now to the drawings in detail, and with particular reference first to FIG. 1, the anonymous interactive telephone system of the present invention is generally referred to by reference number 10. The interactive telephone system 10 involves the interlinking through the public telephone service switching network, shown generally at 13 of a subscriber to the "personals" service and an interested party (the caller). The subscriber has a telephone at a subscriber station 14, and the caller has a telephone at a caller station 16. The parties located at the respective stations 14 and 16 are mutually anonymous, but both are aware of the telephone number of the "personals" service through which communication with complete confidentiality is assured, all of which will be explained in detail hereinafter.

Through public telephone line 11a and the known public telephone service switching network 13, a caller at station 16 can reach an incoming trunk line of the system 10 at caller port A, via public telephone line 12a. This is accomplished by calling a telephone number published in the "personals" column. Similarly, the subscriber at station 14, via public telephone line 11b and switching network 13, can reach an incoming trunk line of the system 10 at subscriber port B, via public telephone line 12b, identified preferably by a second telephone number known only to subscribers to the "personals" service.

In general, lines 11a and 11b, switching network 13, and lines 12a and 12b are provided by the public telephone service. In this regard, all services and equipment provided by the public telephone service are included within the box outlined by dotted line 17.

Ports A and B connect to a digital switch 18, the switching at which is controlled by a system controller 20. While not illustrated, ports A and B, as well as other components to be described hereinafter, are connected to switch 18 through many lines; similarly, switch 18 and other components to be described hereinafter, are connected to controller 20 through many lines, although only one is illustrated for clarity. Further, although not illustrated, numerous known connecting components, such as modems for example, form part of the system 10.

A port C interlinks the digital switch 18 to a speech prompting and recording system 32, while an outgoing port D, designated by the number 34, is connected to public telephone lines 12c and 12d capable of connecting together the caller station and the subscriber station, via public telephone service switching network 13 and telephone lines 11a and 11b. Next, a billing terminal 36 is connected to the system controller 20; and finally, a credit verification port E interlinks the system controller 20 with a credit verification/authorization facility 38.

The different operational steps and component connections referred to hereinbefore and further described hereinafter are under the control of the digital switch 18 which receives commands from the controller 20, or in some cases are under the control of the controller 20 directly. System controller 20 can take the form of known general purpose computers, and includes memory 20a and memory index 20b discussed hereinafter. Thus, programmed operation of the system controller 20 will provide the appropriate commands to the digital switch 18 and other system components for effecting the different operational modes in accordance with the present invention.

The mutually anonymous parties at the subscriber and caller stations 14 and 16, interact with the system 10 of the present invention by presently available touch-tone telephone equipment in accordance with one embodiment of the invention. However, the present invention contemplates the use of speech recognition and other advanced forms of user inputs through which callers and subscribers may interact with the system.

The primary service provided by the system of the present invention involves connecting together, over the telephone lines, a party at a subscriber station 14 and a caller at a caller station 16 for the purpose of their establishing a confidential and anonymous communication with one another; such communications can be initiated by either party. In operation, a subscriber places an advertisement with a magazine, newspaper, or other media offering a "personals" service and provides to the service the wording for a "personals" ad, as well as appropriate instructions relative to his or her desires about receiving calls, such as time-of-day, day-of-week availability, etc., and appropriate billing information. The subscriber also provides his or her telephone number.

The "personals" service then stores the subscriber-provided information in the memory unit 20a of system control 20, takes steps to publish the ad, and indexes the subscriber's telephone number in the memory 20a, via memory index unit 20b, of the system controller 20 to a unique subscriber reference number (SRN) to be published in the ad. The "personals" ad then is published, and it is read by potentially interested parties. Also published is a telephone number that will connect a caller to the system 10 through caller port A, and details about the use of the anonymous interactive telephone system.

A caller initiates a telephone contact with the system 10 by calling the telephone number published in the "personals" column. The telephone is answered by the speech prompting component of system 32 through a digital switch 18 under the control of system controller 20. The caller is prompted to enter credit card information and then a subscriber reference number by touch-tone input from his or her telephone. In response to entry of an SRN, the system controller 20 opens the file of the appropriate subscriber and reads the stored instructions from memory 20a. The speech prompting component of system 32 then furnishes information through the telephone connection to the caller, based on stored instructions from the subscriber. The incoming call from the caller then is transferred either to the subscriber station 14 through the outward dialing port 34, or to the speech recording component within system 32.

If the call is made at a time acceptable to the subscriber, the system controller 20 instructs switch 18 and outward dialing port 34 to call the subscriber station 14 at the stored telephone number. Once the telephone connection is established, the speech prompting component of system 32 preferably requests verification from the subscriber before connecting the caller to the subscriber; such verification could be accomplished by touch-tone of the subscriber's personal access code (PAC) or, alternatively, the subscriber's telephone number. Once it is verified that an authorized individual is on the telephone at the subscriber station 14, connection of the caller to the subscriber is permitted. At no time will either party know the identity or telephone number of the other party unless volunteered during the telephone conversation.

Upon completion of the call, the length of the call is sent to the system controller 20 and subsequently is transmitted to the billing terminal 36; the caller then is billed for the call on the basis of credit information previously obtained by the speech prompting component of system 32, provided by the caller through his or her touch-tone telephone, verified by credit facility 38, and stored in the memory 20a of system controller 20.

If the incoming telephone call from the caller station 16 to the subscriber station 14 cannot be completed (line busy, no answer, wrong time or day, etc.), the call is directed to the speech recording section of system 32. In such case, the caller is asked whether he or she desires that the subscriber return the call, and if so, is requested by the speech prompting component of system 32 to furnish his or her telephone number, to be available only to the system controller. The caller then enters his or her telephone number, by way of the caller's telephone touch-tone pad, which is indexed to the requested subscriber and stored in the database memory 20a of controller 20. The caller at that time is assigned a unique callback reference number (CBRN) that is announced to the caller by the speech prompting system. As the next step, the caller is asked by the speech prompting system whether he or she wishes to furnish a voice message to the subscriber. Such a recorded voice message, if left, is stored in the speech recording component of system 32 for subsequent review by the subscriber to whom the message is addressed.

The subscriber may call into the system 10 at any time in order to review messages (or to perform other tasks described hereinafter). The initial contact is made with the speech prompting component of system 32, as hereinbefore described with respect to incoming calls from the caller, when the subscriber calls the telephone number of subscriber port B. The speech prompting component of system 32, under the direction of the system controller 20, asks the subscriber for his or her subscriber reference number, and then looks up the SRN in the system controller memory 20a. Once the SRN is verified, recorded data and messages directed to that particular subscriber may be reviewed by the subscriber. The subscriber may then, for example, enter instructions to the system controller 20 regarding, for example, which calls, if any, are to be returned. The subscriber may return a telephone call from a caller by touch-tone entry of the caller's callback reference number furnished to the subscriber by the system controller 20 through the speech prompting component of system 32. Once again, connection is made between the caller and the subscriber without either party knowing the identity or telephone number of the other.

Figure 2:
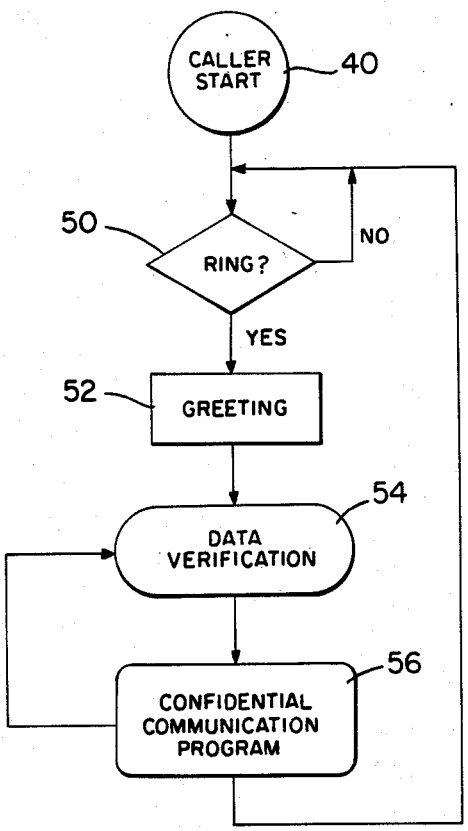
FIG. 2 is a flow chart diagram illustrating the caller interfacing program associated with the telephone system depicted in FIG. 1.

With reference now to FIG. 2, it will be explained how the system controller 20 is programmed to control operation of the digital switch 18 and the various components relating to speech prompting and recording, billing, and call transferring, for interfacing a caller station 16 with the system 10. The program is initiated by the caller as indicated at 40 in FIG. 2. When the telephone number of caller port A is called, connection is initiated at 50. The speech prompting component of system 32, under control of the system controller 20 and the digital switch 18, transmits a greeting to the caller as indicated at 52, and requests certain data in order to initiate a data verification procedure 54.

Figure 2A:
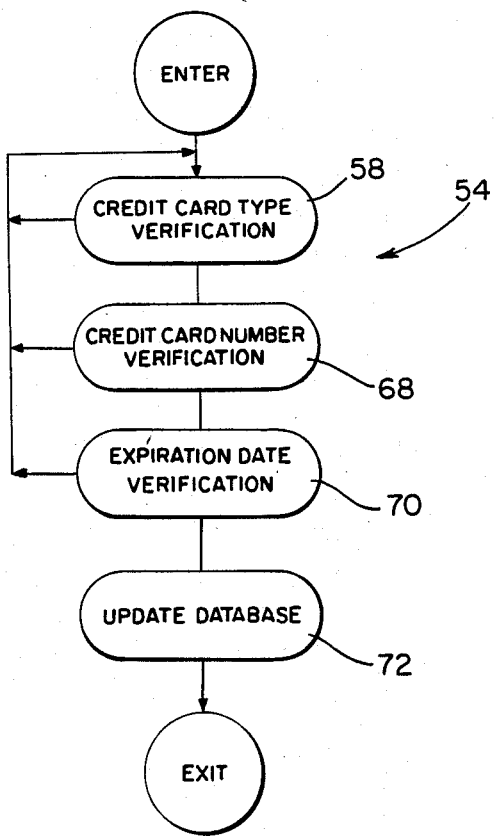
FIGS. 2A and 2B are flow chart diagrams illustrating in greater detail portions of the caller interfacing program illustrated in FIG. 2.
Figure 3:
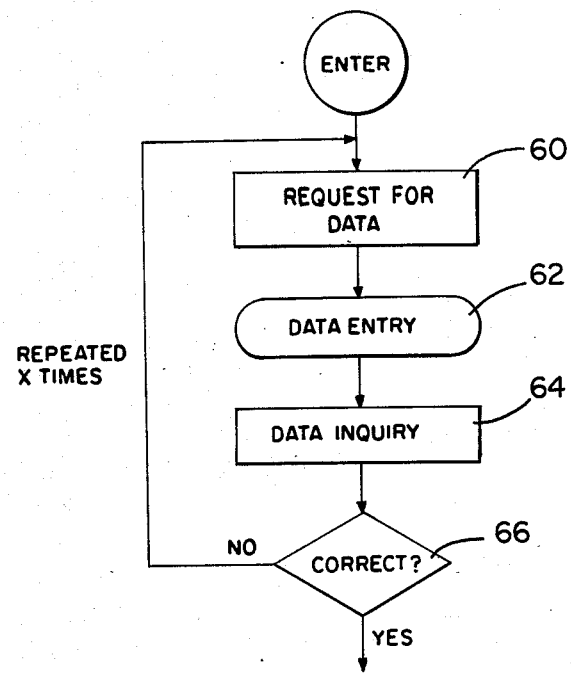
FIGS. 3, 4 and 5 are flow chart diagrams illustrating in greater detail portions of the interfacing program illustrated in FIGS. 2, 2A and 2B.

As shown in greater detail in FIG. 2A, the data verification procedure in accordance with one embodiment of the invention involves receiving credit card data in response to a request, and then searching of a remote database (credit verification/authorization facility 38 of FIG. 1) for verification of the credit card number. Such data verification procedure is further detailed in FIG. 3, and is initiated by a request 60 for data followed by the caller's entry at 62 of the requested data. The caller then verifies at 64 that the data was correctly received, resulting in a decision 66 that the entered data should be utilized. If the entered data is not verified, the procedure is repeated a predetermined number of times, such as 3, until verification occurs. If the entered data is not verified, then the incoming call is disconnected. The process continues to the next sequence if verification occurs.

With continued reference to FIG. 2A, following verification of the of credit card type at 58, the credit card number is verified as indicated at 68. Then, the expiration date of the credit card is verified as indicated at 70. The verification procedure is completed by an update operation 72 of the database forming a part of system controller 20.

After credit verification, the system requests the subscriber reference number from the caller. The SRN is touch-tone entered by the caller and such entry is verified as indicated at 74 in FIG. 2B. The verification procedure 74 is similar to that described in FIG. 3 as hereinbefore described.

After SRN verification, the system issues a command at 76 (FIG. 2B) to access the subscriber instruction file 78. In accordance with one embodiment of the invention, the subscriber instruction file contains various parameters such as status, activity time, and caller message duration. Under the status parameter, the subscriber may instruct the system, through a subscriber interfacing program hereinafter described, that the subscriber reference number is to be deactivated or activated. If deactivated, the system will not transfer calls or take messages, but will deliver to the caller an appropriate informational message by the speech prompting system.

If the subscriber reference number is active, the system will transfer telephone calls from callers in accordance with the activity time and message duration parameters. In regard to the activity time parameter, the subscriber may furnish to the system the desired days of the week and the active hours during each day that calls will be accepted. With respect to receipt of caller messages, the message duration parameter will limit the duration of verbal messages within specified limits in order to accommodate limited time for message review. Information on the foregoing parameters of the subscriber instruction file 78 may be furnished to the caller by the speech prompting component of system 32 as a courtesy along with general information about the system. The caller is also advised by the system that it is checking to see if the requested subscriber is currently available. Such program checking step is depicted at 80. As indicated by reference number 82, if the subscriber is available, a call transferring operation is initiated as depicted at 84. If the subscriber is not available, then the incoming call from the caller is transferred to a recorder under a speech recording operational mode 86, and the telephone number of the caller is requested at 87 for a message to the subscriber.

Figure 4:
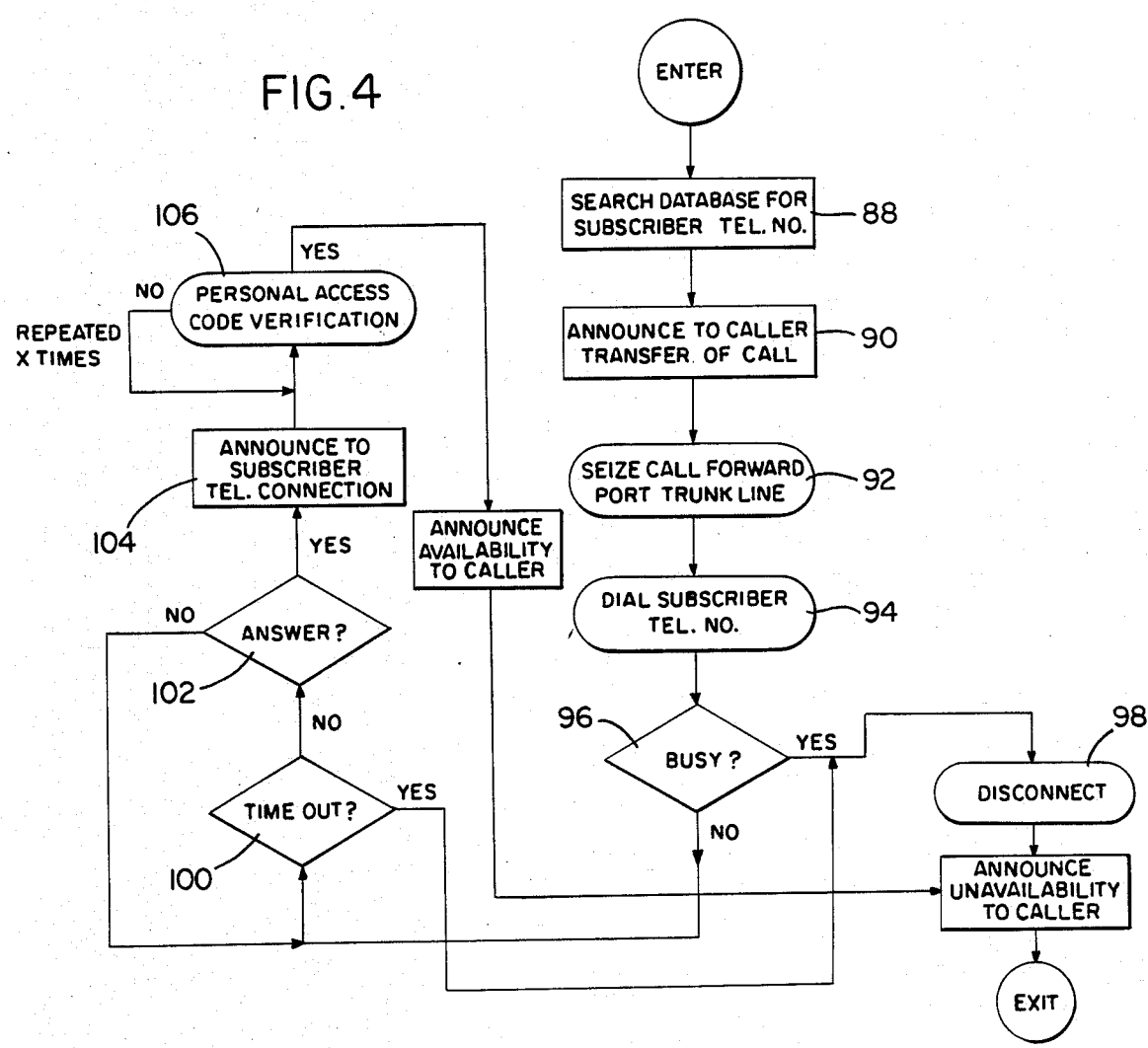

FIG. 4 illustrates in greater detail the program associated with the call transferring operation, initiated by a search of the database at 88 for the subscriber's telephone number corresponding to the SRN entered by the caller. An outgoing trunkline through outward dialing port 34 is then obtained at 92. Such trunkline is connected to the desired subscriber station 14 as shown at 94, utilizing the subscriber telephone number retrieved from the database. If the subscriber's line is busy, as indicated by the program decision 96, the outgoing transferred call to the subscriber is terminated as indicated at 98. Or if the timeout period expires without the subscriber answering the telephone, a line disconnect decision at 100 occurs, and the call attempt is terminated. Otherwise, a telephone connection to the subscriber is completed when the subscriber answers the telephone. The answering subscriber is then prompted to enter his or her personal access code, telephone number, or subscriber reference number, by touch-tone input, and the SRN is verified at 106. During the time when the subscriber is being called and the SRN is being verified, the speech prompting component of system 32 communicates with the caller to provide updates on the status of the call. Once the connection between the caller and the subscriber is established, the system removes the speech prompting component of system 32 from the connection.

Referring again to FIG. 2B, it will be noted that following establishment of the telephone connection between the caller and the subscriber, the program continues by waiting for completion of the call as indicated by reference number 188. A charge computation step 190 then ensues, followed by a connection closing operation 192. A database update operation 194 completes the caller interfacing program.

Figure 2B:
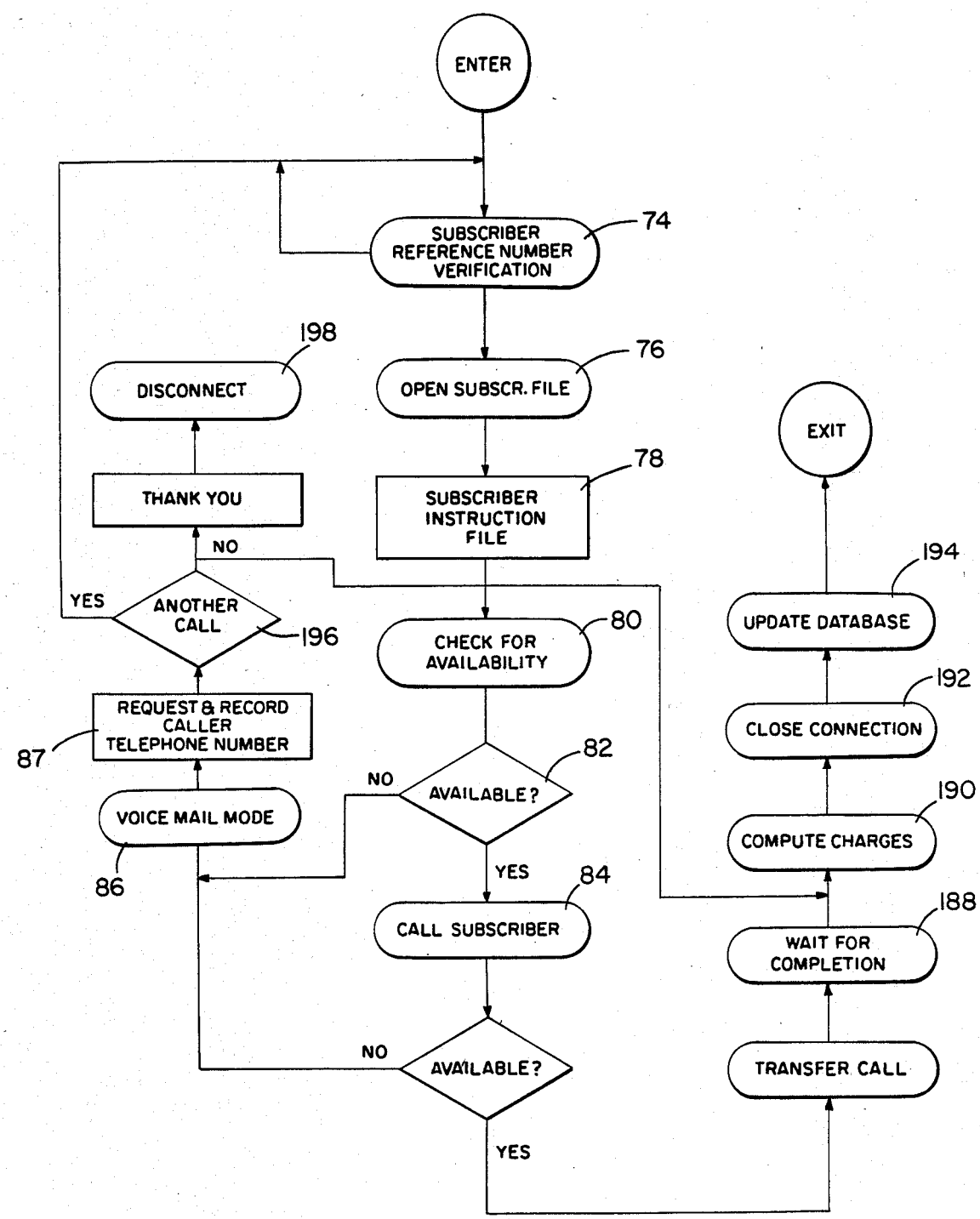

In the event the subscriber to whom a call is to be transferred is not available, then a message recording mode ensues as indicated by reference number 86 in FIG. 2B. Following such message recording operation, the caller may select another subscriber as indicated by reference number 196. In such case, another interfacing program is initiated, bypassing the data verification portion thereof. In the event that no other call is to be initiated, as indicated by decision 196, then the program proceeds to a disconnect operation at 198 followed by the charge computation, connection closing, and database update steps 190, 192, and 194 before the caller interfacing program is completed.

Figure 5:
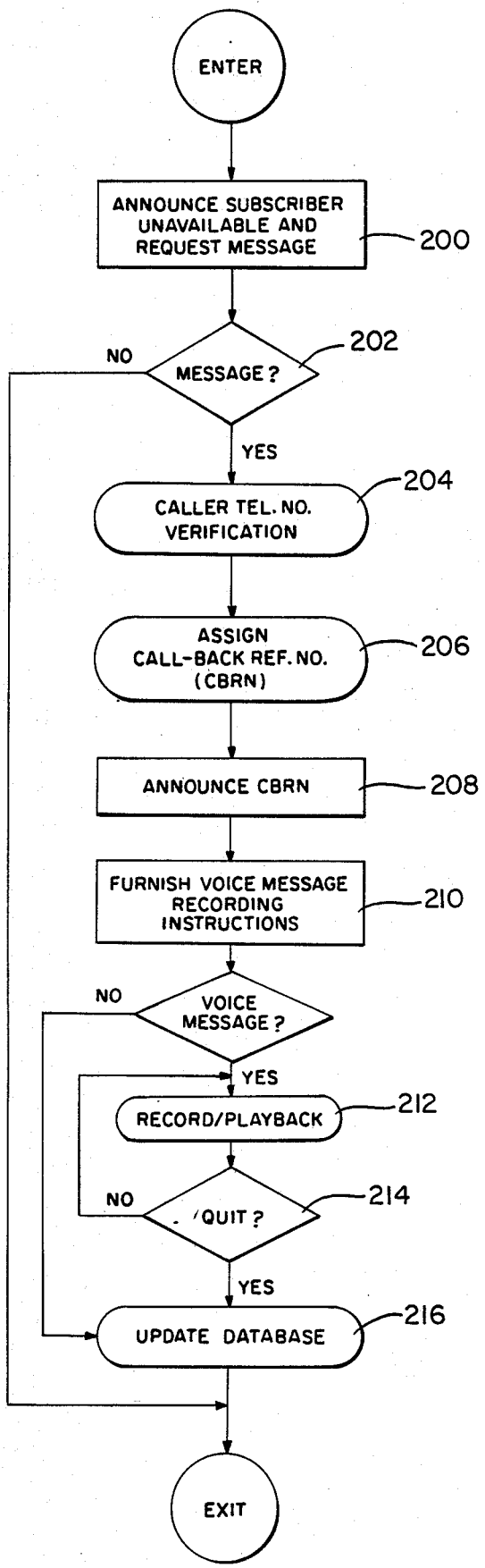

Referring now to FIG. 5, illustrating the program for the message recording mode of operation, such operational mode is initiated with an announcement from the speech prompting component of system 32 to the caller that the subscriber is unavailable and a message can be left as indicated by reference number 200. If no message is desired, the program terminates and the call is disconnected as hereinbefore described with respect to FIG. 2B. On the other hand, if the caller wishes to leave a message, as indicated at decision 202, the caller telephone number is requested and then verified by a verification operation as indicated by reference number 204. A callback reference number is assigned as indicated at 206 and is indexed to the caller's telephone number. Additionally, the caller information is indexed to the particular subscriber to whom the call was placed. The assigned callback reference number is announced to the caller as indicated at 208, followed by the furnishing of voice message recording instructions as indicated at 210. A recording and playback operation 212 then ensues. The caller is then given the option, as indicated at 214, of either accepting or rejecting the recorded message. If the recorded message is rejected, another record/playback session occurs. Once the caller hangs up at the end of a record/playback session, the message recording mode is terminated and the database is updated as indicated at 216.

Figure 6:
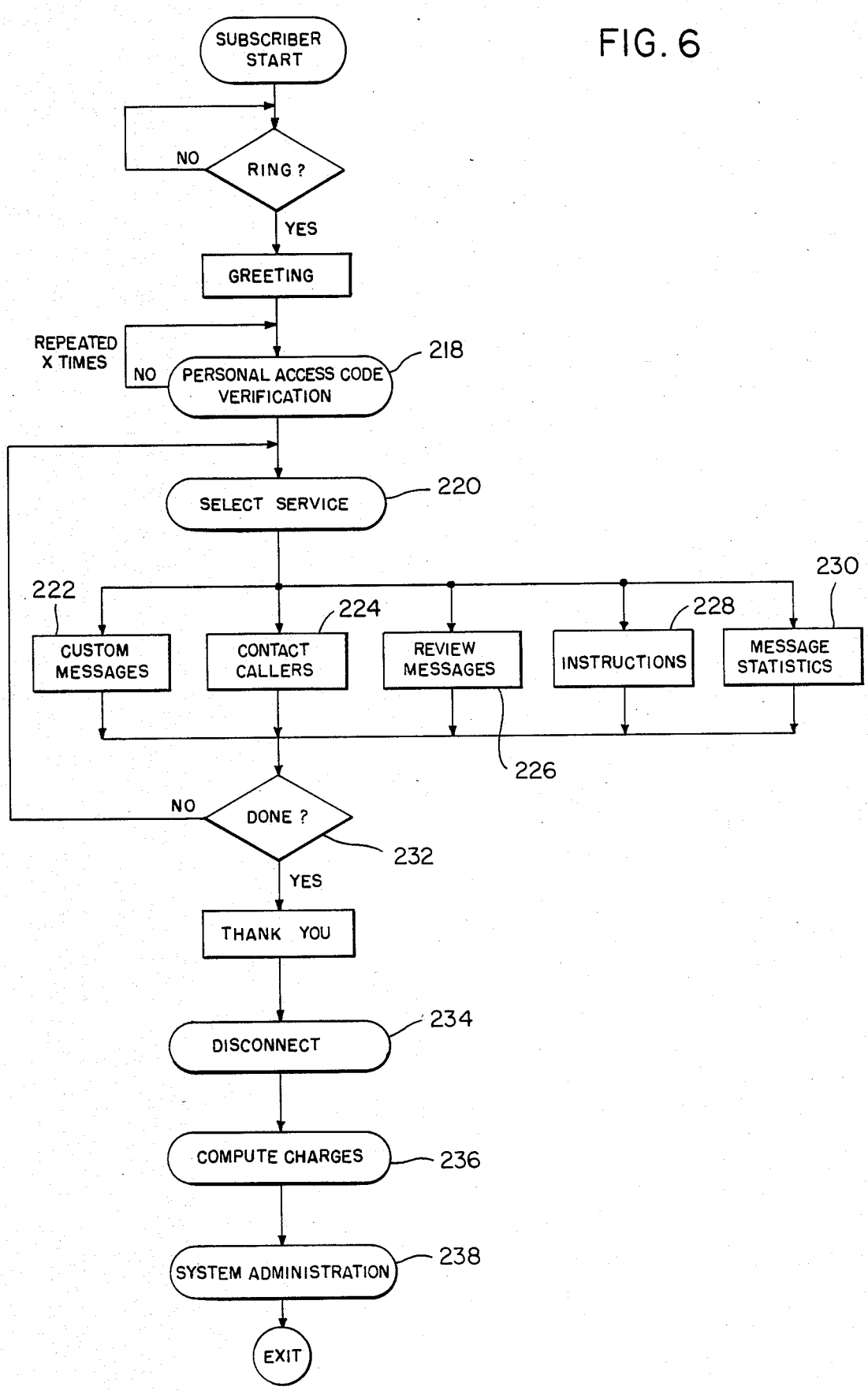
FIG. 6 is a flow chart diagram illustrating the subscriber interfacing program associated with the telephone system depicted in FIG. 1.

FIG. 6 illustrates the subscriber interfacing program initiated by an incoming call to the system 10 from a subscriber station 14 through the subscriber port B, under control of the digital switch 18 and the system controller 20. Such incoming call of the subscriber is met by a greeting originating from the speech prompting component of system 32 similar to the incoming call program illustrated in FIG. 2 with respect to the caller station 14. The subscriber is then prompted to enter by touch-tone input, an access code which is either the same as the published subscriber reference number, or if more security is desired, an unpublished code given to the subscriber when initiating the service. The access code is then verified by a verification operation 218.

Upon verification of the access code of the subscriber, the subscriber may make a selection from a variety of services pursuant to a service selection program 220. In accordance with the embodiment illustrated in FIG. 6, the menu of services includes a custom message service 222, a contact caller service 224, a message review service 226, an instruction entry service 228 and a message statistic service 230. After the selected services are performed, the program continues as indicated at 232 to a disconnect operation 234 followed by a charge computing step 236 and a system administration step 238. The system is then reset to receive another incoming call from the subscriber.

Figure 7:
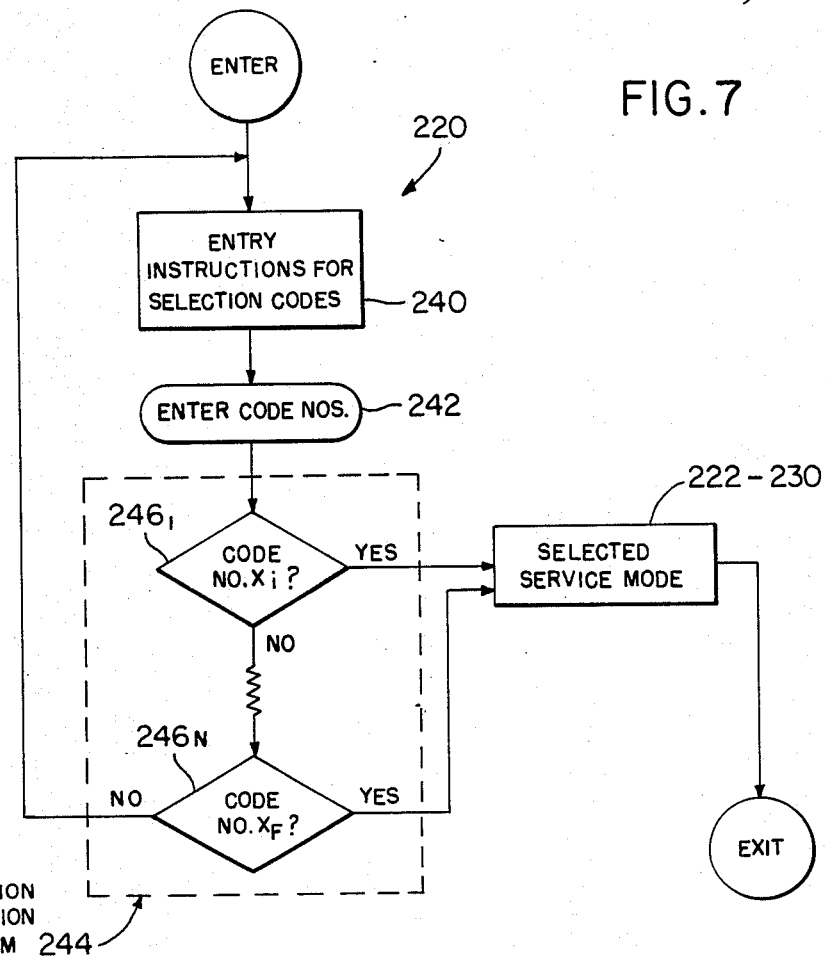
FIGS. 7, 8, 9, 10, 11 and 12 are flow chart diagrams illustrating in greater detail portions of the interfacing program illustrated in FIG. 6.

The service selection program 220 hereinbefore referred to in connection with FIG. 6, is illustrated in greater detail in FIG. 7. The selection program is initiated by speech prompting information transmitted at 240 to the subscriber for entering his or her code selection instructions. The subscriber then enters a selection code number as indicated at 242 in order to initiate a selection execution program 244. The selection execution program 244 consists of a plurality of decision steps $246_1$–$246_n$, the number of code decision steps in the illustrated embodiment being five as depicted in FIG. 6.

Figure 8:
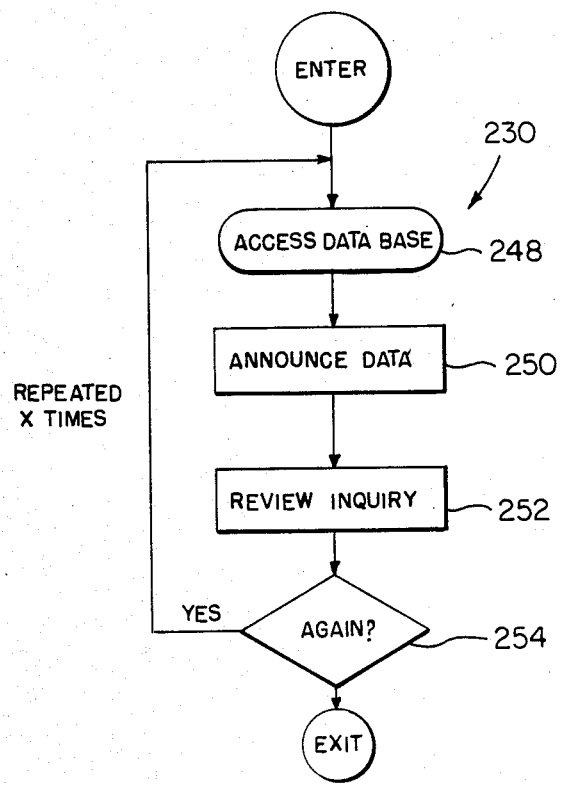

The program associated with the message statistic service 230 is illustrated in detail in FIG. 8. Such program is initiated by an operation providing access to the system database as indicated by reference number 248 followed by an announcement to the subscriber of the message statistic data, as indicated at 250, followed by the step 252 wherein the subscriber, through speech prompting instructions and touch-tone answers, controls the review of such data. The procedure is optionally repeated as indicated at 254 before the message statistic program is terminated.

Figure 9:
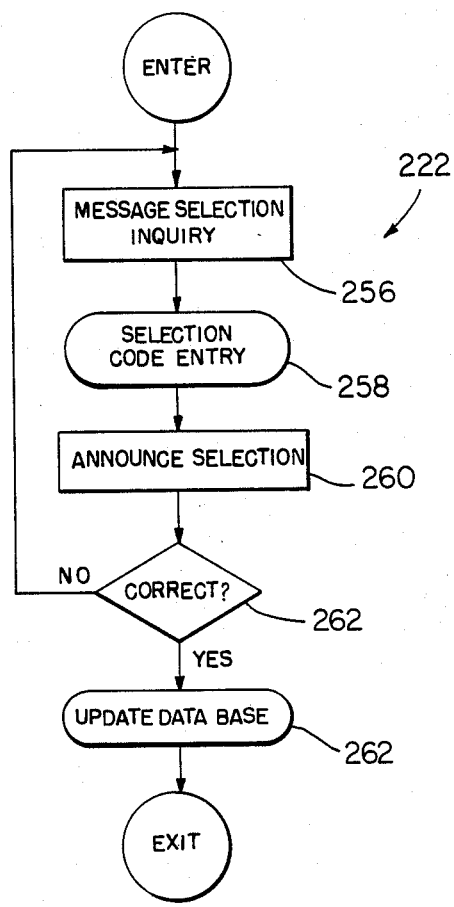

FIG. 9 illustrates in detail the custom message program 222. This program is initiated by a speech prompting message to the calling subscriber inquiring as to message selection, as indicated by reference number 256. The subscriber then enters a selection code as indicated at 258 which is followed by an announcement at 260 of the selection made. If a correct code selection is indicated as denoted by reference number 262, the program is terminated by an update database operation 264.

Figure 10:
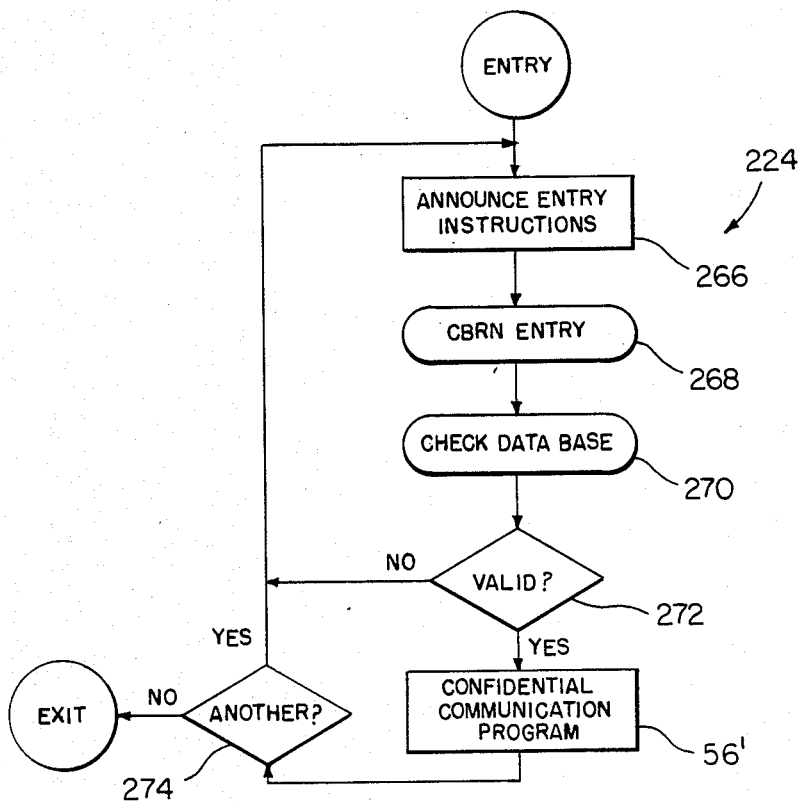

Subroutine 224 for a subscriber to return the call of a caller is illustrated in greater detail in FIG. 10. This program is initiated by a speech prompting announcement to the subscriber providing instructions for entry of information as indicated by reference number 266. The subscriber then enters a desired callback reference number as indicated at 268 which step is followed by a database check 270. If the callback reference number entered by the subscriber is valid, as indicated at 272, the telephone call from the subscriber is directed to the desired caller station in accordance with a confidential communication program 56' hereinbefore described.

Upon completion of the call between the subscriber and the caller, the call is terminated; or if the subscriber remains on the line, he or she may select another caller as indicated at 274, in which case the caller contact program 224 is repeated. Then, the program is terminated.

Figure 11:
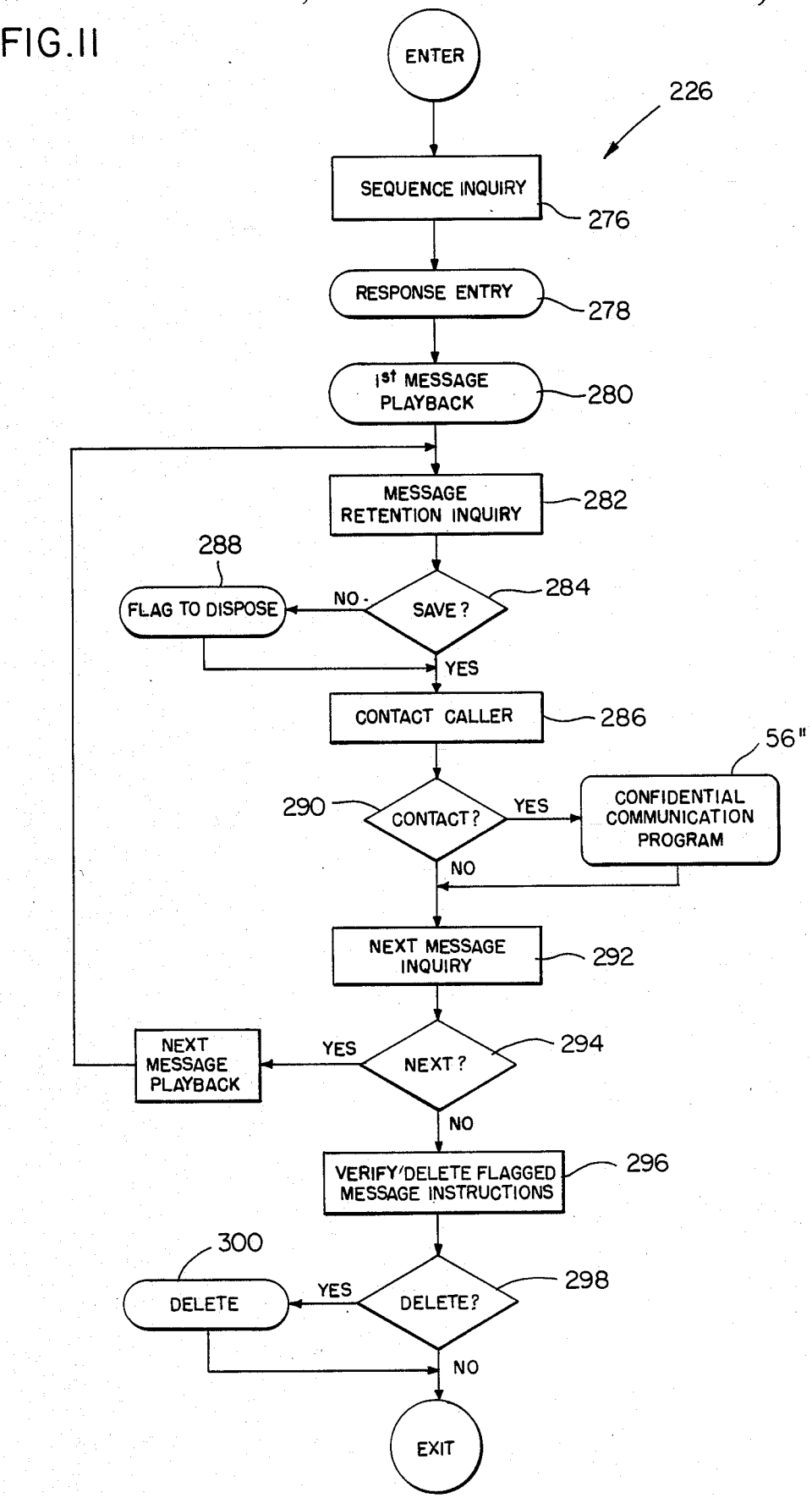

FIG. 11 illustrates in greater detail the message review program 226 initiated by an inquiry from the subscriber. The first step is a speech prompting message to the subscriber calling in as indicated by reference number 276. The speech prompting message prompts the subscriber as to his or her options for handling the messages recorded by the system. The subscriber then enters a choice as indicated at 278 which is followed by a first message playback operation 280. The entry indicated at 278 enables the subscriber to select the order in which the messages are played back. After the first message is played back, the system inquires as to whether such message is to be retained as indicated by reference number 282. If the message just reviewed is to be retained, the program proceeds through step 284 to a step 286 in which the speech prompting system asks the subscriber whether to contact the caller who left such message. On the other hand, if the message just reviewed is to be deleted, it is flagged for subsequent deletion as indicated at 288.

After inquiry is made as to contacting the caller, the program either proceeds through step 290 to a confidential communication program 56" in which the subscriber attempts to reach the caller, or proceeds directly to the next message inquiry 292. The program then proceeds through step 294 either to the beginning of another message review program or to a message deletion operation 296 wherein the speech prompting system informs the subscriber of the imminent deletion of the previously flagged messages. If it is confirmed that the flagged messages are to be deleted, the program proceeds through step 298 to a conclusion or to a message deletion operation 300 before the program is completed.

Figure 12:
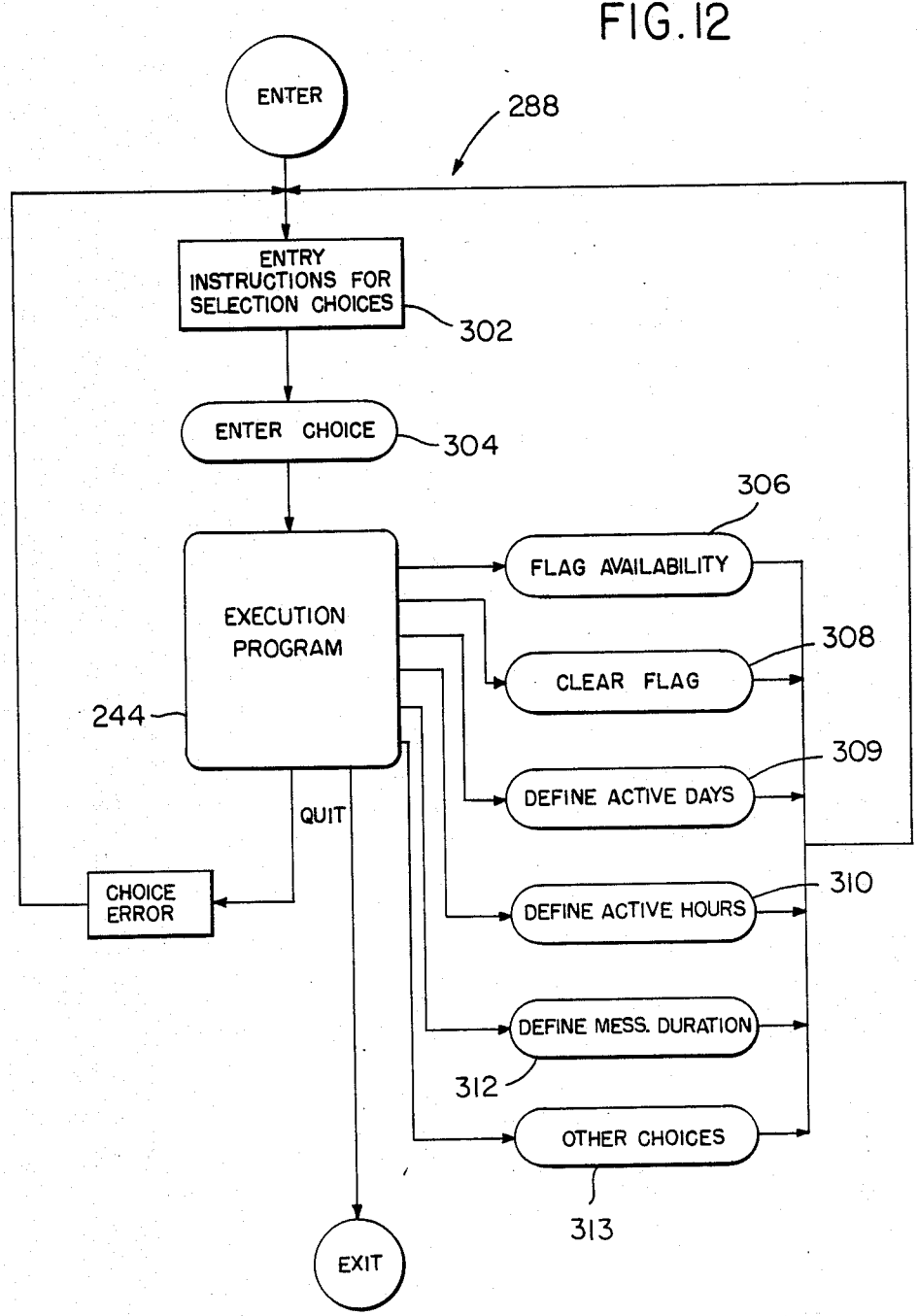

Finally, FIG. 12 illustrates in greater detail the instruction selection program 228 which is used by the subscriber to program when calls are to be received, etc. The program is initiated by instructions given to the subscriber as indicated by reference number 302. The subscriber then enters a selection code as indicated at 304 to initiate a selection execution program 244' as hereinbefore described with respect to FIG. 7. Thus, depending on the entered code, one of the five instruction parameters 306, 308, 309, 310 and 312 is selected for entry into the instruction file 78 as hereinbefore described with respect to FIG. 2B. As an indication that more than five instruction parameters can be used, FIG. 12 illustrates at 313 that other choices may be included in the system.

The foregoing programs are stored within the memory unit 20a of the system controller 20 aforementioned. Such system controller furthermore provides additional services such as system diagnostics and maintenance to determine the state of the system and detects both subtle and major malfunctions. When such malfunctions are detected, the system operator may localize the source of malfunction and institute maintenance. Further, the system controller may provide for system expansion including the redefinition of parameters such as the number of ports, maximum message durations, etc. Management information and database management is also provided for by the system controller 20 to allow for assessment of system performance, enroll new subscribers, make corrections, deactivate service, profile subscriber and caller parties, locate popular subscribers who may be overloading the system, etc.

With respect to the database management, the system controller controls the entry and readout from the database memories of memory unit 20a, which may consist of two files, respectively associated with the subscriber and the caller. Such files contain all information required for operation of the service, including phone numbers, subscriber reference numbers, personal access codes, callback reference numbrs, etc. Finally, the system controller also controls administrative operations as hereinbefore referred to, including accounting functions and support for credit verification. Support is also provided for the speech prompting and recording components of system 32, including prompting/response menus to be redefined on demand and to control the recording, editing, installation and removal of voice messages.

The system hereinbefore described may also be implemented through an Audiotex 976 exchange, a service provided by various ones of the Bell telephone companies. Such an alternative billing arrangement will allow for a fee to be charged whenever a caller calls into the service without the added incumbence of entering credit card numbers, although a more flexible method of billing may be preferred by use of a credit card system. Thus, with the credit card billing method, the caller is still charged a fee upon entry into the system but the system has the option of charging follow-on fees for enrollment of the caller into the system, or time sensitive billing options. In this regard, each time a caller enters a new subscriber reference number, a standard fee can be assessed. The subscribers may also be charged for services provided by this system. For example, if a subscriber returns a caller's message, he or she can be charged in the same manner as a caller. Charges could also be assessed for various extended services such as custom message recording.

Normally, a subscriber's credit card number will be entered into the system upon enrollment. This will allow the subscriber to rapidly return phone calls using the system, without the need for entering credit card information at the beginning of each session. When a charge is applied to a card, it must be authorized by a credit verification service. All credit card authorizations can be effected by a real-time method when the charge is incurred or by a batch method during off-peak periods through the credit verification port E. The use of credit cards allows uniform billing practices independent of the telephone utility local tariff policies. Whichever method of billing is utilized, the system can generate daily, weekly and monthly cash flow statements based on system activity.

A key to the communication security provided by the system hereinbefore resides in the use of various identification code numbers such as the subscriber reference number, the personal access code, the caller reference number, and the call-back reference number. The subscriber reference number is associated with the subscriber's personal ad in a "personals" publication and is used by the caller to identify the desired subscriber. Such subscriber reference number is therefore in the public domain. However, when used in conjunction with a subscriber's personal access code, it allows only the subscriber to access the system services and messages. If a caller enrolls in the system, the caller will receive a caller reference number that will serve in place of the call-back reference number normally issued to a caller by the system. This will give a caller the same service as a subscriber.

The subscriber reference numbers are periodically changed by the advertiser, such as monthly, weekly, etc. Typically, the subscriber reference number is composed of a date code and an index number. The date code corresponds to the formal release date of the ad and the index number is a unique identifier distinguishing the subscriber from other subscribers for placing ads during the same schedule period.

The personal access code aforementioned is the subscriber's private code allowing access for various services provided by the system including message access. It is the key to the subscriber's privacy and should be known only to the subscriber. It is used in conjunction with the subscriber reference number to provide a unique access key to the various subscriber services.

The callback reference number is created by the system and provided to callers when they leave a message for a subscriber. It is a unique number that the subscriber may use to identify particular callers when the subscriber is returning phone calls.

The subscriber and caller database memories aforementioned, cover various fields. The subscriber reference number is stored in the database to identify each subscriber enrolled in the system and is issued when the subscriber places an ad in the publication. Also stored in the database is the phone number of the subscriber to whom calls are to be forwarded. The personal access code of the subscriber stored in the database file of the subscriber is a private access code used with the subscriber reference number as aforementioned. When the subscriber customizes the system as hereinbefore explained, various parameters selected by the subscriber are stored. Such parameters instruct the system about the subscriber's availability, how to handle messages, etc. Statistical data valuable to the subscriber is also stored in the subscriber database which includes the number of callers, etc.

The caller database includes specifically different fields than those hereinbefore described with respect to the subscriber database. Such caller database fields include the callback reference number aforementioned which is a unique index identifying each caller who has left a message in the system, and the telephone number of the caller. The caller reference number, if appropriate, is a unique index that identifies each caller enrolled in the system as a subscriber. Also included in the caller database is a message pointer which points to the message left in the speech recording system for playback to the subscriber. When a caller is enrolled in the system, additional fields will be included in the caller database similar to those in the subscriber database.

The foregoing is considered as illustrative of the principles of the invention. Since numerous modifications and changes will readily occur to those skilled in the art, it is not desired to limit the invention to the exact construction and operation shown and described, and accordingly, all suitable modifications and equivalents are intended to fall within the scope of the invention. For example, while the present invention has been described with specific reference to "personal ads", it could be used in other fields such as standard classified advertising and the like. That is, a subscriber can place a classified ad, can receive calls without divulging his or her telephone number, can return calls, and can simply discontinue the ad if, for example, goods for sale have been sold. Therefore, the intention is that the present invention not be limited by the above, but only be limited as set forth in the appended claims.

What is claimed is:

1. A telephone communication method for anonymously enabling a subscriber at a subscriber station to communicate with a caller at a caller station, said method allowing said caller to communicate with said subscriber without said caller knowing the identity of said subscriber prior to establishing communication with said subscriber, but knowing a particular subscriber with whom communication is desired, and allowing the identity of said particular subscriber and said caller to be kept anonymous during communication between said particular subscriber and said caller unless voluntarily revealed by either said particular subscriber or said caller, said method including the steps of:

storing data at a system controller station that is received from a plurality of subscribers at a plurality of subscriber stations, such data including the telephone number of each of said subscriber stations and a corresponding reference number for each of said subscriber stations;

publishing the telephone number of said system controller station and publishing advertisements including said reference numbers for said corresponding subscriber stations;

receiving a call from a caller station to said system controller station;

receiving a published reference number corresponding to a telephone number of said particular subscriber at a particular subscriber station from said caller at said caller station in communication with said system controller station;

matching said received published reference number with the telephone number of said particular subscriber station; and automatically transferring said call received from said caller station at said system controller station to said particular subscriber station.

2. The method of claim 1 and further including the step of storing call transferring instructions at said system controller station as programmed by each of said subscribers at said subscriber stations.

3. The method of claim 1 and further comprising the step of recording a message from said caller station in communication with said system controller station if said particular subscriber station is unavailable to receive a call.

4. The method of claim 3 including the step of enabling said subscriber at said particular subscriber station to review recorded messages.

5. The method of claim 1 wherein the published reference number can be made inactive by said subscriber at said subscriber station.

6. The method of claim 1 wherein data received from said caller station in communication with said system controller station is stored at said system controller station, said data including a telephone number of said caller station in communication with said system controller station and a corresponding caller reference number for said caller station.

7. The method of claim 1 and further comprising the step of receiving data from a caller station such as to enable the caller station to become a subscriber station.

8. A telephone communication network for anonymously interlinking a subscriber at a subscriber station and caller at a caller station for effecting communication between said subscriber and said caller, the network including:

system controller means having a published telephone number;

memory means in said system controller means, said memory means containing stored telephone numbers and corresponding published reference numbers for a plurality of subscriber stations, and means for indexing said published reference numbers to the corresponding telephone numbers;

means for communicating with said system controller means by way of said published telephone number; and means for transferring a call from a caller station received at said system controller means to a particular subscriber station upon the provision by a caller station of a published reference number for said particular subscriber station so that the identity of said subscriber at said particular subscriber station can be unknown to said caller at said caller station prior to establishing communication between said caller and said subscriber, and the identity of said subscriber and said caller can be kept anonymous during communication between said subscriber and said caller unless voluntarily revealed by either said subscriber or said caller.

9. The network of claim 8 and further comprising means for recording a message from said caller station upon the unavailability of said particular subscriber station, said message including a call-back reference number;

means for storing a telephone number of said caller station and indexing said telephone number to said call-back reference number;

means for playing back said message to said particular subscriber station; and means for anonymously enabling communication between said particular subscriber station and said caller station on the basis of subscriber station input of said call-back reference number of said caller station.

10. The network of claim 8 and further comprising means for recording a message from said caller station in communication with said system controller means upon the unavailability of said particular subscriber station, and means for playing back the recorded message to said particular subscriber station.

11. A method of anonymously enabling communication between a caller and a subscriber over public telephone lines, said method allowing said caller to communicate with said subscriber without said caller knowing the identity of said subscriber prior to establishing communication with said subscriber, but knowing a particular subscriber with whom communication is desired, and allowing the identity of said particular subscriber and said caller to be kept anonymous during communication between said particular subscriber and said caller unless voluntarily revealed by either said particular subscriber or said caller, said method comprising the steps of:

providing a published telephone number of a system controller;

storing in said system controller telephone numbers of a plurality of subscribers;

assigning to each subscriber a subscriber reference number corresponding to the subscriber's telephone number;

publishing an advertisement for each subscriber that contains a message and the subscriber's reference number;

receiving a call from a caller at said system controller through the means of said published telephone number of said system controller;

receiving a particular subscriber's published reference number corresponding to said particular subscriber from said caller; and routing the call from said caller to said particular subscriber by indexing the received subscriber reference number to the corresponding stored telephone number and calling said particular subscriber's telephone number.

12. The method of claim 11 and further comprising the steps of:

recording a message upon the unavailability of said particular subscriber; and providing the message to said particular subscriber.

13. The method of claim 11 wherein said subscriber's reference number can be made inactive by said subscriber.

14. The method of claim 11 and further comprising the step of verifying said subscriber reference number of said particular subscriber before connecting said particular subscriber to said caller.

15. The method of claim 11 and further comprising the step of receiving data from said caller such as to enable said caller to become a subscriber.

16. A method of enabling communication between a caller and a subscriber over public telephone lines, said method allowing said caller to communicate with said subscriber without knowing the identity of said subscriber prior to establishing communication with said subscriber, but knowing a particular subscriber with whom communication is desired, and allowing the identity of said particular subscriber and said caller to be kept anonymous unless voluntarily revealed by either said particular subscriber or said caller, said method comprising the steps of:

publishing a telephone number of a system controller station;

storing telephone numbers of subscribers and indexing said telephone numbers to corresponding published subscriber identifiers, said published subscriber identifiers being published in the public media;

receiving a call at said system controller station through the means of said published telephone number, and receiving a particular published subscriber identifier corresponding to said particular subscriber; and transferring the received call to said particular subscriber by indexing the received particular published subscriber identifier to the telephone number of said particular subscriber.

17. A telephone communication method for anonymously interlinking a subscriber station and a caller station, the method including the steps of:

storing data at a system controller station that is received from a plurality of subscriber stations, such data including the telephone number of each of said subscriber stations and a corresponding reference number for each of said subscriber stations;

publishing the telephone number of said system controller station and ads including the reference numbers for respective subscriber stations;

receiving a call from a caller station to said system controller station;

receiving a published reference number corresponding to a particular subscriber station from said caller station in communication with said system controller station;

matching said received published reference number with the telephone number of said particular subscriber station;

automatically transferring said call received from said caller station at the system controller station to said particular subscriber station depending upon the availability of said particular subscriber station; and recording a message from said caller station in communication with said system controller station if said particular subscriber station is unavailable to receive a call, such recorded message including a call-back reference number of said caller station that is indexed to a stored telephone number of said caller station.

18. The method of claim 17 including the step of enabling a subscriber at said particular subscriber station to review said recorded messages, including the call-back reference number but not the telephone number of said caller station.

19. The method of claim 17 wherein each subscriber station is provided with a telephone number to access said system controller station, and wherein each subscriber station calling said system controller station can be anonymously connected to a caller station by supplying said call-back reference number of said caller station.

20. A telephone communication network for anonymously interlinking a subscriber station and a caller station, the network including:

system controller means having a published telephone number;

memory means in said system controller means, said memory means containing stored telephone numbers and corresponding published reference numbers for a plurality of subscriber stations, and means for indexing said published reference numbers to the corresponding telephone numbers;

means for communicating with said system controller means by way of said published telephone number;

means for transferring a call from a caller station to a particular subscriber station on the basis of caller station input of a published reference number for a particular subscriber station;

means for recording a message from said caller station upon the unavailability of said particular subscriber station, said message including a call-back reference number;

means for storing a telephone number of said caller station and indexing said telephone number to said call-back reference number;

means for playing back said message to said particular subscriber station; and means for anonymously connecting said particular subscriber station to said caller station on the basis of subscriber station input of said call-back reference number of said caller station.

21. A method of anonymously connecting a caller to a subscriber over public telephone lines, comprising the steps of:

providing a published telephone number of a system controller;

storing in said system controller telephone numbers of a plurality of subscribers;

assigning to each subscriber a subscriber reference number corresponding to the subscriber's telephone number;

publishing an ad for each subscriber that contains a message and the subscriber's reference number;

receiving a call from a caller at said system controller through the means of said published telephone number;

receiving a particular subscriber's published reference number corresponding to a particular subscriber from said caller;

routing the call from said caller to said particular subscriber depending upon the availability of said particular subscriber by indexing the received particular subscriber's published reference number to the corresponding stored telephone number and calling said particular subscriber's telephone number;

recording a message and a call-back reference number upon the unavailability of said particular subscriber;

providing the message and said call-back reference number to said particular subscriber; and connecting said particular subscriber to said caller upon the particular subscriber providing the call-back reference number of said caller.

22. A telephone communication method for anonymously interlinking a subscriber station and a caller station, the method including the steps of:

storing data at a system controller station that is received from a plurality of subscriber stations, such data including the telephone number of each of said subscriber stations and a corresponding reference number for each of said subscriber stations;

publishing the telephone number of said system controller station and ads including the reference numbers for respective subscriber stations;

receiving a call from a caller station to said system controller station;

receiving a published reference number corresponding to a particular subscriber station from said caller station in communication with said system controller station;

matching said received published reference number with the telephone number of said particular subscriber station;

announcing to said caller station in communication with said system controller station the availability times of said particular subscriber corresponding to said published reference number received from said caller station; and automatically transferring said call received from said caller station at the system controller station to said particular subscriber station depending upon the availability of said particular subscriber station.

23. A telephone communication method for anonymously interlinking a subscriber station and a caller station, the method including the steps of:

storing data at a system controller station that is received from a plurality of subscriber stations, such data including the telephone number of each of said subscriber stations and a corresponding reference number for each of said subscriber stations;

publishing the telephone number of said system controller station and ads including the reference numbers for respective subscriber stations;

receiving a call from a caller station to said system controller station;

receiving a published reference number corresponding to a particular subscriber station from said caller station in communication with said system controller station;

matching said received published reference number with the telephone number of said particular subscriber station;

automatically transferring said call received from said caller station at the system controller station to said particular subscriber station;

wherein data received from said caller station in communication with said system controller station is stored at said system controller station, such data including a telephone number of said caller station in communication with said system controller station and a corresponding caller reference number for said caller station.

24. A telephone communication method for anonymously interlinking a subscriber station and a caller station, the method including the steps of:

storing data at a system controller station that is received from a plurality of subscriber stations, such data including the telephone number of each of said subscriber stations and a corresponding reference number for each of said subscriber stations;

publishing the telephone number of said system controller station and ads including the reference numbers for respective subscriber stations;

receiving a call from a caller station to said system controller station;

receiving a published reference number corresponding to a telephone number of a particular subscriber station from said caller station in communication with said system controller station;

matching said received published reference number with the telephone number of said particular subscriber station; and automatically transferring said call received from said caller station at the system controller station to said particular subscriber station if said reference number is active and valid.

25. A method of anonymously connecting a caller to a subscriber over public telephone lines comprising the steps of:

providing a published telephone number of a system controller;

storing in said system controller telephone numbers of a plurality of subscribers;

assigning to each subscriber a subscriber reference number corresponding to the subscriber's telephone number;

publishing an ad for each subscriber that contains a message and the subscriber's reference number;

receiving a call from a caller at said system controller through the means of said published telephone number;

receiving a particular subscriber's published reference number corresponding to a particular subscriber from said caller; and routing the call from said caller to said particular subscriber if said reference number is active and valid by indexing the received reference number to the corresponding stored telephone number and calling said particular subscriber's telephone number.

26. A telephone communication method for anonymously enabling a subscriber at a subscriber station to communicate with a caller at a caller station, said method allowing said caller to communicate with said subscriber without said caller knowing the identity of said subscriber prior to establishing communication with said subscriber, but knowing a particular subscriber with whom communication is desired, and allowing the identity of said particular subscriber and said caller to be kept anonymous during communication between said particular subscriber and said caller unless voluntarily revealed by either said particular subscriber or said caller, said method including the steps of:

storing data at a system controller station that is received from a plurality of subscribers at a plurality of subscriber stations, such data including the telephone number of each of said subscriber stations and corresponding reference number for each of said subscriber stations;

publishing the telephone number of said system controller station and publishing advertisements including said reference numbers for said corresponding subscriber stations;

receiving a call from a caller station to said system controller station;

receiving a published reference number corresponding to a telephone number of said particular subscriber at a particular subscriber station from said caller at said caller station in communication with said system controller station;

matching said received published reference number with the telephone number of said particular subscriber station; and automatically transferring said call received from said caller station at said system controller station to said particular subscriber station depending upon the status of said received published reference number.

27. The method of claim 26 wherein the received published reference number from said caller station in communication with said system controller station must be an active and valid number to enable communication between said subscriber at said subscriber station and said caller at said caller station.

28. A method of anonymously enabling communication between a caller and a subscriber over public telephone lines, said method allowing said caller to communicate with said subscriber without said caller knowing the identity of said subscriber prior to establishing communication with said subscriber, but knowing a particular subscriber with whom communication is desired, and allowing the identity of said particular subscriber and said caller to be kept anonymous during communication between said particular subscriber and said caller unless voluntarily revealed by either said particular subscriber or said caller, said method comprising the steps of:

providing a published telephone number of a system controller;

storing in said system controller telephone numbers of a plurality of subscribers;

assigning to each subscriber a subscriber reference number corresponding to the subscriber's telephone number;

publishing an advertisement for each subscriber that contains a message and the subscriber's reference number;

receiving a call from a caller at said system controller through the means of said published telephone number of said system controller;

receiving a particular subscriber's published reference number corresponding to said particular subscriber from said caller; and routing the call from said caller to said particular subscriber depending upon the status of said particular subscriber's published reference number by indexing the received subscriber reference number to the corresponding stored telephone number and calling said particular subscriber's telephone number.

29. The method of claim 28 wherein said received published reference number must be an active and valid number to enable communication between a subscriber and a caller.

30. A telephone communication method for anonymously enabling a subscriber at a subscriber station to communicate with a caller at a caller station, said method allowing said caller to communicate with said subscriber without said caller knowing the identity of said subscriber prior to establishing communication with said subscriber, but knowing a particular subscriber with whom communication is desired, and allowing the identity of said particular subscriber and said caller to be kept anonymous during communication between said particular subscriber and said caller unless voluntarily revealed by either said particular subscriber or said caller, said method including the steps of:

storing data at a system controller station that is received from a plurality of subscribers at a plurality of subscriber stations, such data including the telephone number of each of said subscriber stations and corresponding reference number for each of said subscriber stations;

publishing the telephone number of said system controller station and publishing advertisements including said reference numbers for said corresponding subscriber stations;

receiving a call from a caller station to said system controller station;

receiving a published reference number corresponding to a telephone number of said particular subscriber at a particular subscriber station from said caller at said caller station in communication with said system controller station;

matching said received published reference number with the telephone number of said particular subscriber station; and automatically transferring said call received from said caller station at said system controller station to said particular subscriber station depending upon the availability of said particular subscriber station; and recording a message from said caller at said caller station in communication with said system controller station if said particular subscriber station is unavailable to receive a call, such recorded message including a call-back reference number of said caller station that is indexed to a stored telephone number of said caller station.

31. The method of claim 30 including the step of enabling a subscriber at said particular subscriber station to review said recorded message, including the call-back reference number but not the telephone number of said caller station.

32. The method of claim 30 wherein each subscriber at a subscriber station is provided with a telephone number to access said system controller station, and wherein each subscriber at a subscriber station calling said system controller station can be allowed to anonymously communicate with a caller at a caller station by supplying said call-back reference number of said caller station.

33. The method of claim 30 and further comprising the step of announcing to said caller station in communication with said system controller station availability times of said particular subscriber station corresponding to said received published reference number from said caller at said caller station.

34. A method of anonymously enabling communication between a caller and a subscriber over public telephone lines, said method allowing said caller to communicate with said subscriber without said caller knowing the identity of said subscriber prior to establishing communication with said subscriber, but knowing a particular subscriber with whom communication is desired, and allowing the identity of said particular subscriber and said caller to be kept anonymous during communication between said particular subscriber and said caller unless voluntarily revealed by either said particular subscriber or said caller, said method comprising the steps of:

providing a published telephone number of a system controller;

storing in said system controller telephone numbers of a plurality of subscribers;

assigning to each subscriber a subscriber reference number corresponding to the subscriber's telephone number;

publishing an advertisement for each subscriber that contains a message and the subscriber's reference number;

receiving a call from a caller at said system controller through the means of said published telephone number of said system controller;

receiving a particular subscriber's published reference number corresponding to said particular subscriber from said caller;

routing the call from said caller to said particular subscriber depending upon the availability of said particular subscriber, by indexing the received subscriber reference number to the corresponding stored telephone number and calling said particular subscriber's telephone number;

recording a message and a call-back reference number upon the unavailability of said particular subscriber;

providing the message and said call-back reference number to said particular subscriber; and enabling communication of said particular subscriber with said caller upon the subscriber providing the call-back reference number of said caller.

35. A method of anonymously enabling communication between a caller and a subscriber over public telephone lines, said method allowing said caller to communicate with said subscriber without said caller knowing the identity of said subscriber prior to establishing communication with said subscriber, but knowing a particular subscriber with whom communication is desired, and allowing the identity of said particular subscriber and said caller to be kept anonymous during communication between said particular subscriber and said caller unless voluntarily revealed by either said particular subscriber or said caller, said method comprising the steps of:

providing a published telephone number of a system controller;

storing in said system controller telephone numbers of a plurality of subscribers;

assigning to each subscriber a subscriber reference number corresponding to the subscriber's telephone number;

publishing an advertisement for each subscriber that contains a message and the subscriber's reference number;

receiving a call from a caller at said system controller through the means of said published telephone number of said system controller;

receiving a particular subscriber's published reference number corresponding to said particular subscriber from said caller;

indexing the received subscriber reference number to the corresponding stored telephone number and calling said particular subscriber's telephone number;

receiving identification from said particular subscriber; and routing the call from said caller to said particular subscriber only upon said particular subscriber providing proper identification.

* * * * *